United States Patent [19]

Jaconette

[11] 4,164,958

[45] Aug. 21, 1979

[54] SWING CHECK VALVE

[75] Inventor: John J. Jaconette, Shelton, Conn.

[73] Assignee: Jenkins Brothers, Bridgeport, Conn.

[21] Appl. No.: 848,113

[22] Filed: Nov. 3, 1977

[51] Int. Cl.$^2$ ............................................. F16K 15/03
[52] U.S. Cl. .................................. 137/527; 137/527.8
[58] Field of Search .................. 137/527, 527.2, 527.4, 137/527.6, 527.8; 251/228, 298, 299

[56] References Cited

U.S. PATENT DOCUMENTS

| 200,678 | 2/1878 | Whitney | 137/527.2 |
|---|---|---|---|
| 274,222 | 3/1883 | Pfau | 137/527.2 |
| 290,314 | 12/1883 | Blessing | 137/527.8 |
| 2,048,943 | 7/1936 | Munn | 137/527 |
| 2,454,072 | 11/1948 | Long | 137/527.8 X |
| 2,925,827 | 2/1960 | Anderson et al. | 137/527.4 |
| 3,331,391 | 7/1967 | Merdinyan | 137/527 |

*Primary Examiner*—William R. Cline

*Attorney, Agent, or Firm*—Mattern, Ware, Davis & Stoltz

[57] ABSTRACT

A swing-type check valve designed for allowing the flow of fluids in one direction only is constructed with a swinging hanger assembly comprising two hanger members, each member held pivotally captive on a hanger pin secured to the valve casing, whereby each hanger member is rotatable on the hanger pin. A portion of each hanger member defines a convex recess such that the pair of hanger members can interfit with and embrace the valve disc neck of a unitary valve clapper. The unitary valve clapper comprises a valve disc, a protruding cylindrical valve disc neck and a buttonhead of larger diameter than the valve disc neck. The hanger members closely embrace the valve disc neck and hold the valve clapper firmly in position. This hanger design allows the valve clapper to be constructed in one piece, eliminating problems of valve failure due to dimensional variations resulting from inability to define tolerances in composite valve clapper assemblies.

9 Claims, 11 Drawing Figures

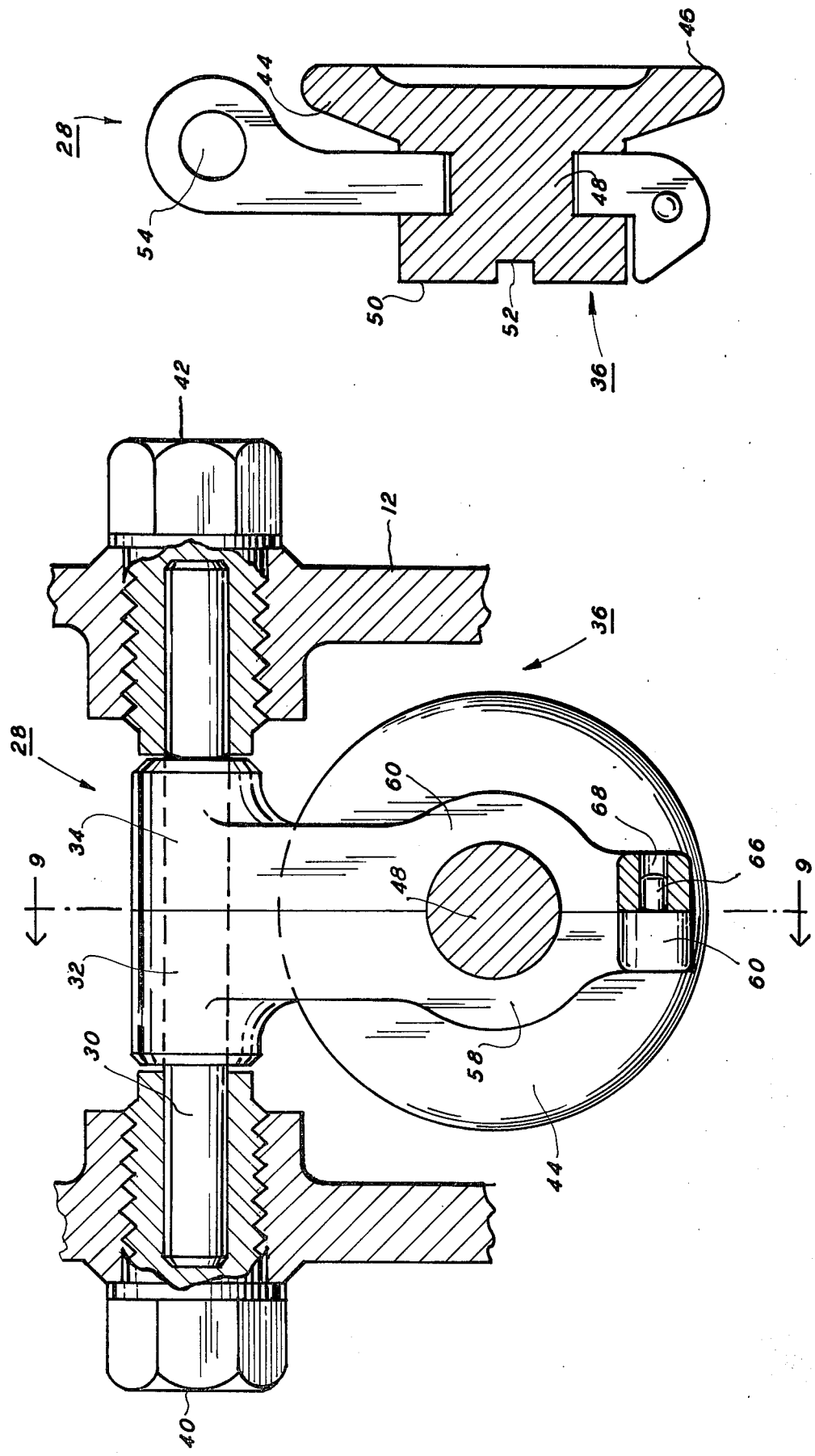

SWING CHECK VALVE

FIELD OF THE INVENTION

This invention relates to check valves and more particularly to check valves having a swinging hanger assembly.

BACKGROUND OF THE INVENTION

Check valves are often used in plumbing and piping systems to block the flow of fluid in a particular direction. A common check valve configuration includes a pivoted swinging hanger assembly which carries a valve clapper. The pressure of a fluid in one direction will force open the valve permitting the flow of fluid in that direction. The hanger assembly is mounted in such a way that when fluid pressure in a given direction decreases, gravity causes the valve to close, thereby preventing any fluid from flowing in the opposite direction.

Conventional swing check valve hangers were typically manufactured in one piece, with the valve clapper secured through the use of a threaded stud and nut, or a nut and bolt. This method, however, often prevented the mounting of the valve clapper on the hanger assembly within the desired close tolerances. Merdinyan, U.S. Pat. No. 3,331,391; Munn, U.S. Pat. No. 2,048,943; Long, U.S. Pat. No. 2,454,072; and Anderson et al, U.S. Pat. No. 2,925,827 all utilize a one-piece hanger arm, which necessitated attaching the valve clapper to the hanger arm through the use of a screw or nut, giving rise to problems of inadvertent disassembly from vibration, and difficulties of defining tolerances due to machining inaccuracies. Differences in threading or tightening of the nut made it impossible to define tolerances closely. This often resulted in the valve clapper being mounted loosely to the hanger assembly. Such loose mounting would often result in valve-disc heel hang-ups, closure failures, and mis-alignment or wear of the valve disc. Pfau, U.S. Pat. No. 274,222, employs a one-piece valve clapper, but the hanger arm is also one piece, which requires an additional connecting piece, necessary to attach the valve disc assembly to the hanger arm. Therefore, the problems encountered with two-piece valve clappers are still present.

The present invention utilizes a two-piece hanger assembly, and a one-piece valve clapper which can be manufactured to close tolerances. As there are no nuts, bolts, or threads used, the possibility of valve failure due to loosening of the valve clapper and hanger assembly is eliminated. Tolerances can be maintained to one or two thousandths of an inch, thereby eliminating any chance of valve failure due to sticking or mis-alignment of the valve disc. Costs of manufacture and assembly are also reduced.

Accordingly, it is a principal object of this invention to provide means and apparatus to enable the manufacture of swing-type check valves with closely defined tolerances, and hence eliminating valve failure due to imprecise manufacturing.

It is a further object of this invention to provide increased reliability of swing-type check valves at a reduction in costs of manufacture and assembly.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

DESCRIPTION OF THE DRAWINGS

FIG. 8 is a fragmentary enlarged cross-sectional elevational view illustrating the construction of the check valve clapper and hanger assembly shown in FIGS. 1 and 2.

FIG. 9 is a corresponding enlarged cross-sectional side elevation view of the same clapper and hanger assembly, taken along plane 9—9 in FIG. 8.

DETAILED DESCRIPTION

Figure 1:
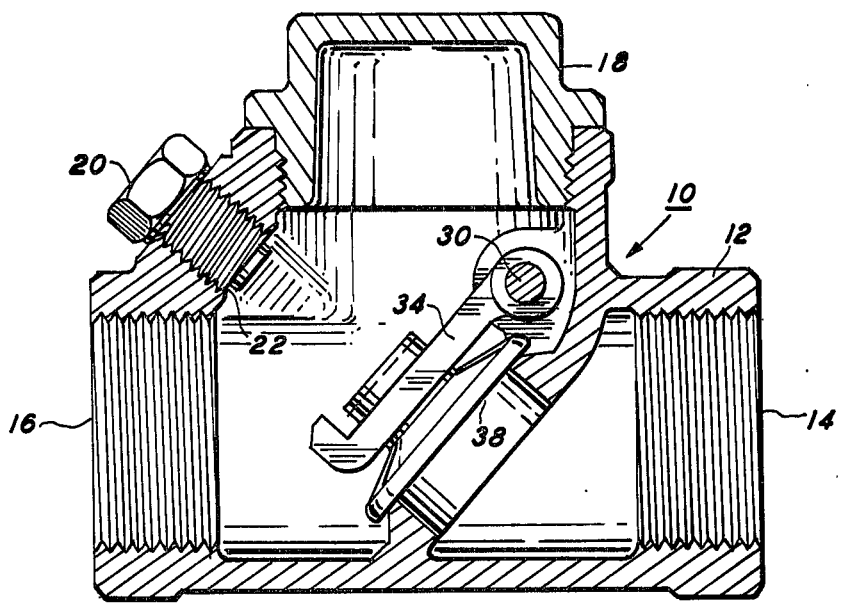
FIG. 1 is a cross-sectional side elevational view of a representative swing check valve, constructed according to the teachings of the invention.

Referring now to the drawings, there is shown in FIG. 1 a swing type check valve 10 having a body or casing 12, an inlet port 14, an outlet port 16 and a valve cap 18. Both the inlet port 14 and the outlet port 16 are threaded or otherwise manufactured to accommodate pipes or other such fluid transmission conduits. The valve cap 18 is removable to permit repair or inspection of the interior of the valve 10. The check valve 10 also includes a stop plug 20, which when removed exposes a tool access hole 22, and side plug holes 24 and 26 located on either side of the valve casing 12. The valve hanger assembly 28 is positioned inside the check valve 10.

Figure 2:
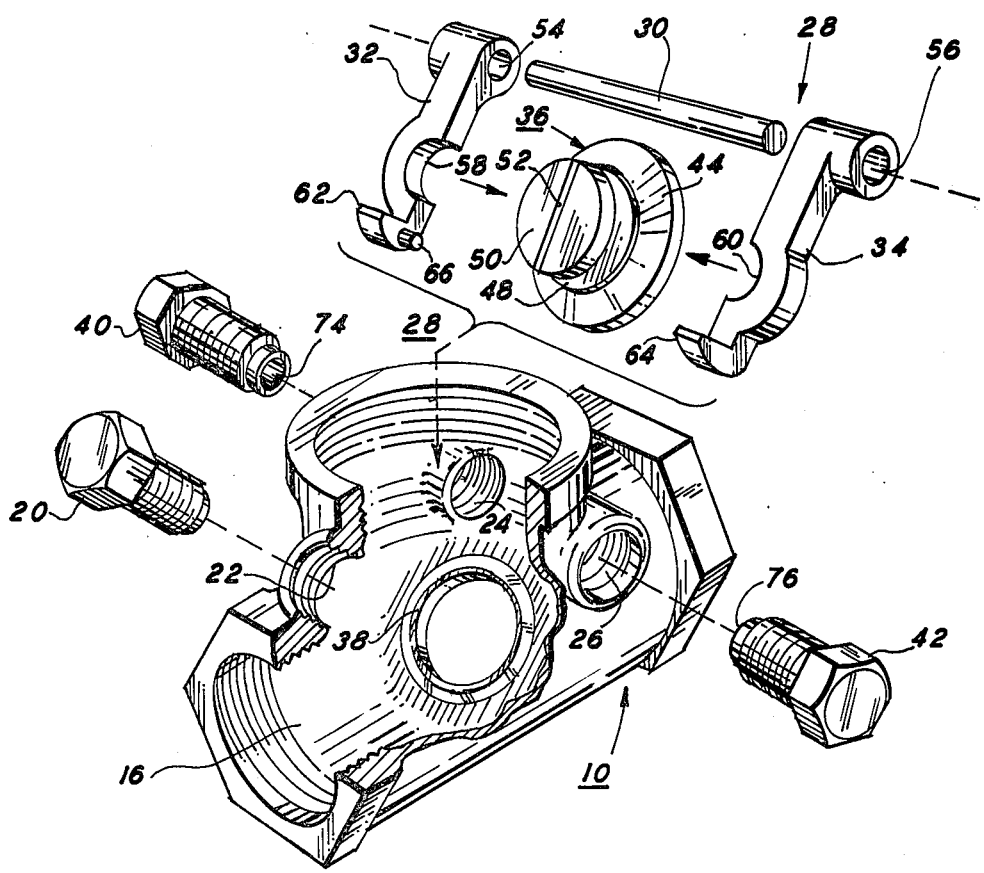
FIG. 2 is a fragmentary exploded perspective view of the check valve body and hanger assembly shown in FIG. 1, partially cut away.

The construction of the valve hanger assembly 28 is shown more clearly in FIG. 2. The hanger assembly 28 is comprised of a hanger pin 30, a left hanger member 32 and a right hanger member 34, both pivotally mounted upon the hanger pin 30, and juxtaposed to each other, and a valve clapper 36, interfitted between and embraced by the left and right hanger members 32 and 34.

Figure 6:
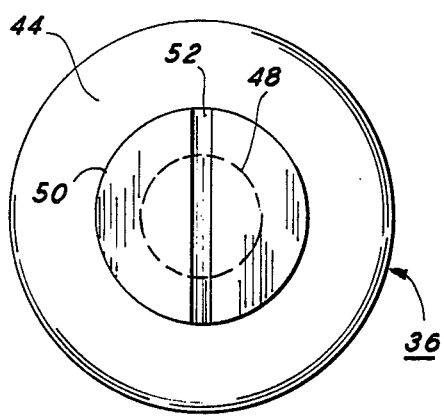
FIG. 6 is a front elevational view of the valve clapper shown in FIGS. 1 and 2.
Figure 7:
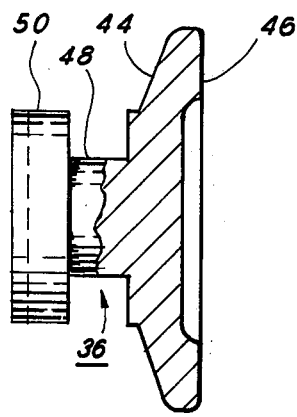
FIG. 7 is a side elevational view of the valve clapper shown in FIGS. 1 and 2.

FIG. 2 also illustrates the interior of the check valve 10 with the valve hanger assembly 28 removed. Also shown are a valve seat 38 facing the outlet port 16 within the interior of the valve 10, side plugs 40 and 42 on the outlet port side of the valve seat 38 and the tool access hole 22 within the valve casing 12. The configuration of the valve clapper 36 is shown in FIGS. 6 and 7. The valve clapper 36 comprises a valve disc 44, one side of which forms a valve seating surface 46 designed to contact the valve seat 38. A cylindrical valve disc neck 48 able to be interfitted between and embraced by the left and right hanger members 32 and 34 protrudes from the opposite side of the valve disc 44. A buttonhead 50 is formed on the end of the valve disc neck 48. Both the valve disc 44 and the buttonhead 50 have larger diameters than the valve disc neck 48. This allows the valve clapper 36 to be held in place without slipping when the valve disc neck 48 is embraced by the left and right hanger members 32 and 34. The buttonhead also includes a transverse positioning slot 52 located on the outer surface of the buttonhead 40.

Figure 3:
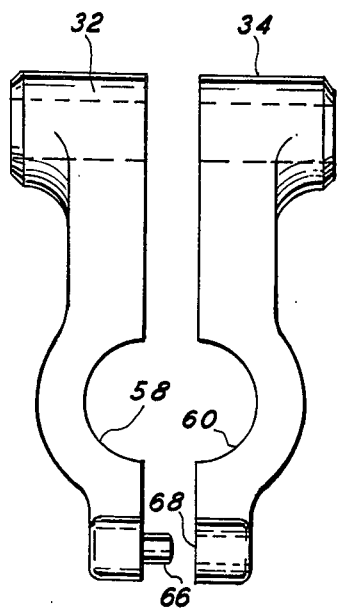
FIG. 3 is a front elevational exploded view of the two-part valve hanger assembly shown in FIG. 2.
Figure 4:
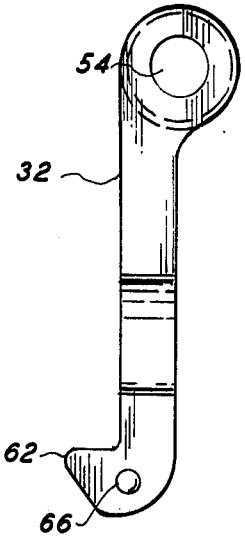
FIG. 4 is a side elevational view of the left valve hanger member, shown in FIG. 3.
Figure 5:
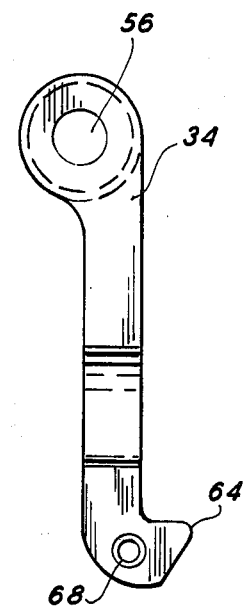
FIG. 5 is a side elevational view of the right valve hanger member, shown in FIG. 3.

FIG. 3, along with FIGS. 4 and 5, shows the left hanger member 32 and the right hanger member 34 in detail. One end of the left hanger member 32 defines a hole 54, which receives the hanger pin 30. The corresponding end of the right hanger member 34 defines a hole 56 which also receives the hanger pin 30. The left and right hanger members 32 and 34 are manufactured such that a portion of each hanger member 32 and 34 defines a concave semicircular recess, the curved portion 58 defined by the left hanger member 32 being juxtaposed to the curved portion 60 defined by the right hanger member 34, to receive the valve clapper 36. The left hanger member 32 and the right hanger member 34 are free to pivot about the hanger pin 30 within the confines of the valve casing 12.

Located at the free end of the left hanger member 32 is a protruding stop member 62, which comes into contact with the stop plug 20 during rotation, thereby limiting the degree of movement of the left hanger member 32 within the valve casing 12. A similar protruding stop member 64 is located at the free end of the right hanger member 34. The protruding stop member 64 also contacts with the stop plug 20 during rotation, restricting the movement of the right hanger member 34 in the same manner as the left hanger member 32. The free end of the left hanger member 32 and the right hanger member 34 also include a positioning means which allows the left and right hanger members 32 and 34 to pivot about the hanger pin 30 in a unitary manner. A positioning pin 66 located on the left hanger member 32 which fits into a hole 68 in the free end of the right hanger member 34 forms the positioning means. When the left and right hanger members 32 and 34 are in angular registration, pivoted on the hanger pin 30, juxtaposed such that the positioning means is operative, the recessed portion 58 of the left hanger member 32, in conjunction with the recessed portion 60 of the right hanger member 34, together define a circular aperture.

Figure 8A:
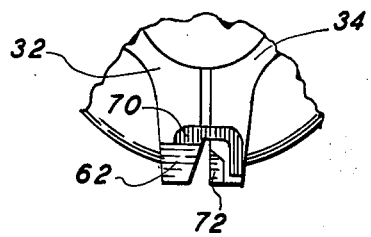
FIG. 8A is an enlarged fragmentary elevational view of a modified valve hanger assembly comparable to that shown in FIG. 8.
Figure 10:
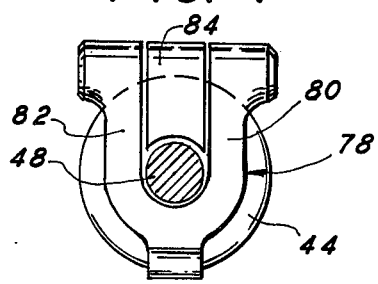
FIG. 10 is a cross-sectional front elevational view of a different valve hanger assembly.

Referring now to FIG. 8, the construction of the valve hanger assembly 28 will be shown. The left and right hanger members 32 and 34 are positioned such that the curved portions 58 and 60 each fit around the valve neck 48 of the valve clapper 36. The valve disc 44 and buttonhead 50 each have a diameter larger than than of the valve disc neck 48, thereby acting to keep the valve neck in clapper 36 position. The manufacturing dimensions of the valve neck 48 and adjacent surfaces can be quite closely controlled, so that the freedom of movement of the valve clapper 36 within the valve hanger assembly 28 when the left and right hanger members 32 and 34 are in position can be controlled to as little tolerance as desired. This is possible since the valve clapper 36 is manufactured in one piece. Previously, valve clappers were manufactured in two or more pieces so that valve clappers were often bolted into place. This often necessitated threading of the valve neck which made it difficult to define tolerances very closely, since differences in thread machining or bolt tightness would vary the tightness of the valve clapper in the entire valve hanger assembly. The one-piece valve clapper eliminates problems of valve disc misalignment or valve failure due to sticking or inadvertent disassembly that may have been caused by bolt loosening from vibration or prolonged use. FIG. 9 further illustrates the manner in which the left and right hanger members 32 and 34 interfit between and embrace the valve clapper 36. The clapper 36 can be made so that the valve disc neck 48 interfits with the left and right hanger members 32 and 34 as tightly as desired. The positioning pin 66 located on the left hanger member 32 and the positioning hole 68 located on the right hanger member 34 will come into registration when the hanger members 32 and 34 are positioned around the valve disc neck 48. This acts to decrease any relative motion between the hanger members 32 an 34. FIG. 8A shows an alternate embodiment of the valve hanger positioning means. A U-shaped member 70 extends from the left hanger member 32 around the protruding stop member 72 of the right hanger member 34, thereby acting to restrict any relative motion of the left and right hanger members 32 and 34. FIG. 10 illustrates an alternate embodiment of the two-piece hanger assembly. Rather than utilizing two optically reflective members which interfit with and embrace the valve disc neck 48, the embodiment of FIG. 10 uses a U-shaped hanger member 78 having arms 80 and 82 which pivot on the hanger pin 30 and a short central member 84, which is disposed between the arms 80 and 82 of the U-shaped hanger member 78, pivotally mounted on the hanger pin 30 and cooperates with the U-shaped hanger member 78 to interfit with and embrace the valve disc neck 48 of the valve clapper 36. This embodiment retains the advantage of allowing a one-piece valve clapper while eliminating the need for any positioning means between the juxtaposed hanger members. The entire valve hanger assembly 28 is positioned inside check valve 10 as shown in FIG. 2, so that the valve seating surface 46 is juxtaposed to the valve seat 38 when the check valve 10 is in its closed position. The positioning slot 52 allows the valve clapper 36 to be turned by using a screwdriver or similar tool inserted through the tool access hole 22, in order to hone and smooth any imperfections between the valve seat surface 46 and the valve disc seat 38. The side plug holes 66 and 68 are threaded to receive the side plugs 26 and 28. When the side plugs 26 and 28 are in position in the side plug holes 66 and 68, the ends of the hanger pin 30 will fit into the positioning holes 74 and 76 of the side plugs 40 and 42. The side plugs 40 and 42 are then tightened and the valve hanger assembly 28 is held in its desired position. The valve hanger assembly 28 is free to pivot about the hanger pin 30 responsive to the flow of fluid through the check valve 10. When fluid is flowing through the check valve 10 from the inlet port 14 toward the outlet port 16, fluid pressure will force the valve disc 44 away from the valve disc seat 38, thereby causing the entire valve hanger assembly 28 to pivot about the hanger pin 30. The protruding stop members 62 and 64 which extend from the left and right hanger portions 32 and 34 act as a stop when they come in contact with the stop plug 20. Since the positioning of the valve clapper 36 within the valve hanger assembly 28 is closely controlled, it is certain that the valve seating surface 46 will always return to close contact with the valve disc seat 38 whenever the check valve 10 is in a closed position, resulting from a drop in fluid pressure or a change in the direction of the fluid flow.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language might be said to fall therebetween.

I claim:
1. A swing-type check valve comprising:
   a. a hollow valve casing, defining an inlet port and an outlet port, and incorporating a transverse internal partition having an aperture encircled by a valve seat facing the outlet port;
   b. two juxtaposed hanger members, each independently pivotally mounted inside the valve casing on substantially coaxial pivot axes and defining between themselves a valve disc neck-embracing opening,
   c. a unitary valve clapper having:
      (1) a valve disc disposed between the inlet and outlet ports within the interior of the valve casing, cooperatively juxtaposed to the valve seat, and
      (2) a valve disc neck protruding from the valve disc, having a reduced hanger-engaging portion, shaped to interfit between and be embraced by the two juxtaposed pivoted hanger members, bounded by facing, hanger-embracing surfaces minimizing relative movement between the assembled valve clapper and the juxtaposed pivoted hanger members,
   whereby the valve clapper is carried by the two juxtaposed pivoted hanger members, pivotally responsive to check and block any return flow of fluid through the valve.

2. The swing-type check valve described in claim 1, wherein the valve hanger comprises:
   a. a hanger pin fixedly mounted to the valve casing;
   b. two juxtaposed hanger members each independently pivotally mounted on the hanger pin, each having a positioning means cooperating with the positioning means of the other and linking the valve hanger members allowing pivotal motion about the hanger pin in angular registration.

3. The swing-type check valve described in claim 1, wherein the valve hanger comprises:
   a. a hanger pin fixedly mounted to the valve casing;
   b. two juxtaposed hanger members each independently pivotally mounted on the hanger pin, comprising a U-shaped member and a central member interfitted with the U-shaped member, which between themselves define a valve disc neck-embracing opening.

4. The swing-type check valve described in claim 1, wherein the unitary valve clapper comprises:
   a. a valve disc disposed between the inlet and outlet ports within the interior of the valve casing, cooperatively juxtaposed to and facing the valve seat,
   b. a valve disc neck protruding from the outlet port side of the valve disc, shaped to interfit between and be embraced by the two juxtaposed pivoted hanger members, and
   c. an enlarged buttonhead formed on the distal end of the valve disc neck, with the valve disc and the buttonhead being larger than the neck-embracing opening and respectively having facing, hanger-embracing surfaces minimizing relative movement between the assembled valve clapper and juxtaposed pivoted hanger members, and where the buttonhead surface opposite the valve disc neck side defines a substantially flat surface having a slot whereby the unitary valve clapper may be turned to smooth any imperfections in the sealing surface.

5. The swing-type check valve described in claim 1, wherein the hanger assembly incorporates a male positioning means protruding from one hanger member engageable with a female positioning means formed into the other hanger member.

6. The swing-type check valve described in claim 1, wherein the hanger assembly incorporates a U-shaped positioning means protruding from one hanger member engageable with and able to hook around a positioning member protruding from the other hanger member.

7. The swing-type check valve described in claim 1, wherein the juxtaposed hanger members each incorporate a stop means whereby the limits of movement of the valve clapper can be controlled by abutting engagement of the stop means with the valve casing, whereas contact of the valve clapper with the valve casing is avoided.

8. A swing-type check valve comprising:
   a. a hollow valve casing, defining an inlet port and an outlet port, and incorporating a transverse internal partition having an aperture encircled by a valve seat facing the outlet port;
   b. a valve hanger comprising:
      (1) a hanger pin, fixedly mounted inside the valve casing on the valve seat side of the partition,
      (2) two juxtaposed hanger members, each independently pivotally mounted on the hanger pin, and defining between themselves a valve disc neck-embracing opening, having positioning means comprising interlocking members, whereby the two juxtaposed hanger members pivot about the hanger pin in angular registration;
   c. a unitary valve clapper having:
      (1) a valve disc disposed between the inlet and outlet ports within the interior of the valve casing, cooperatively juxtasposed to and facing the valve seat,
      (2) a valve disc neck protruding from the outlet port side of the valve disc, shaped to interfit between and be embraced by the two juxtaposed pivoted hanger members, and
      (3) an enlarged buttonhead formed on the distal end of the valve disc neck and where the buttonhead surface opposite the valve neck side defines a substantially flat surface having a slot, whereby the unitary valve clapper may be turned to smooth any imperfections in the sealing surface, with the valve disc and the buttonhead being larger than the neck-embracing opening and respectively having facing, hanger-embracing surfaces minimizing relative movement between the assembled valve clapper and juxtaposed pivoted hanger members,
   whereby the entire valve is carried by the two juxtaposed pivoted hanger members, responsive to check and block any return flow of fluid through the valve.

9. A swing-type valve comprising:

a. a hollow valve casing, defining an inlet port and an outlet port, and incorporating a transverse internal partition having an aperture encircled by a valve seat facing the outlet port;
b. a first hanger member,
   (1) pivotally mounted on a first pivot axis inside the valve casing, and
   (2) incorporating a portion for partially embracing a valve disc neck;
c. a second hanger member,
   (1) independently pivotally mounted on a second pivot axis substantially coaxial with the first pivot axis,
   (2) in juxtaposed spaced relationship with the first hanger member,
   (3) incorporating a portion for partially embracing the valve disc neck, the two hanger members adapted for cooperative embracing of the valve disc neck;
d. a unitary valve clapper having:
   (1) a valve disc disposed between the inlet and outlet ports within the interior of the valve casing, cooperatively juxtaposed to the valve seat, and
   (2) a valve disc neck protruding from the valve disc, having a reduced hanger-engaging portion, shaped to interfit between and be embraced by the two juxtaposed pivoted hanger members, bounded by facing, hanger-embracing surfaces minimizing relative movement between the assembled valve clapper and the juxtaposed pivoted hanger members, whereby the valve clapper is carried by the two juxtaposed pivoted hanger members, pivotally responsive to check and block any return flow of fluid through the valve.

* * * * *

UNITED STATES PATENT AND TRADEMARK OFFICE
CERTIFICATE OF CORRECTION

PATENT NO. : 4,164,958
DATED : August 21, 1979
INVENTOR(S) : John J. Jaconette

It is certified that error appears in the above-identified patent and that said Letters Patent are hereby corrected as shown below:

Column 3, line 53:  cancel "than" and substitute
  --that--

Column 4, line 15:  cancel "an" and substitute
  --and--

Column 6, line 47:  cancel "juxtasposed" and substitute
  --juxtaposed--.

Signed and Sealed this

Eighth Day of April 1980

[SEAL]

Attest:

Attesting Officer

SIDNEY A. DIAMOND

Commissioner of Patents and Trademarks